(12) United States Patent
Sun

(10) Patent No.: US 7,336,587 B2
(45) Date of Patent: Feb. 26, 2008

(54) OPTICAL PICKUP HEAD COMPATIBLE WITH MULTIPLE OPTICAL RECORDING MEDIA

(75) Inventor: Wen-Hsin Sun, Tucheng (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 526 days.

(21) Appl. No.: 11/077,945

(22) Filed: Mar. 11, 2005

(65) Prior Publication Data

US 2006/0077855 A1    Apr. 13, 2006

(30) Foreign Application Priority Data

Sep. 7, 2004    (TW) .............. 93120634 A

(51) Int. Cl.
*G11B 7/00*    (2006.01)
(52) U.S. Cl. .................... 369/112.28; 369/112.01
(58) Field of Classification Search ........... 369/112.28, 369/112.01, 112.02, 112.29, 44.23, 44.37
See application file for complete search history.

(56) References Cited

U.S. PATENT DOCUMENTS

| | | | |
|---|---|---|---|
| 5,189,655 A | 2/1993 | Ogata et al. | |
| 6,324,150 B1 | 11/2001 | Ju | |
| 6,442,124 B1 | 8/2002 | Chung et al. | |
| 6,654,336 B2 | 11/2003 | Kadowaki et al. | |
| 6,747,939 B2 | 6/2004 | Saitoh et al. | |
| 6,922,268 B2 * | 7/2005 | Hama et al. | 359/204 |
| 7,006,269 B2 * | 2/2006 | Hama et al. | 359/204 |
| 7,023,787 B2 * | 4/2006 | Katayama | 369/112.01 |
| 2003/0090988 A1 | 5/2003 | Sun et al. | |
| 2003/0185136 A1 | 10/2003 | Kaiho et al. | |
| 2003/0235137 A1 | 12/2003 | Nishioka et al. | |
| 2004/0156302 A1 * | 8/2004 | Nakata et al. | 369/112.17 |
| 2005/0226124 A1 * | 10/2005 | Kimura et al. | 369/112.08 |

\* cited by examiner

*Primary Examiner*—Thang V. Tran
(74) *Attorney, Agent, or Firm*—Morris Manning Martin LLP; Tim Tingkang Xia, Esq.

(57) ABSTRACT

An optical pickup head compatible with multiple optical recording media includes three light sources, a prism unit disposed beside the light sources, a reflective multi-surface prism disposed beside the prism unit for multiple reflecting light beams therethrough, a collimating lens disposed beside the reflective multi-surface prism for collimating light beams there through, and an objective lens. The prism unit includes a first portion facing the first light source for passing the first light beam therethrough, a second portion facing the second light source for passing the second light beam therethrough, a third portion facing the third light source for passing the third light beam therethrough, a first aspherical surface for correcting aberrations of the first light beam caused by non-matching, and a second aspherical surface for correcting aberrations of the second light beam caused by non-matching.

20 Claims, 6 Drawing Sheets

OPTICAL PICKUP HEAD COMPATIBLE WITH MULTIPLE OPTICAL RECORDING MEDIA

BACKGROUND OF THE INVENTION

1. Field of the Invention

The present invention generally relates to optical pickup heads compatible with multiple optical recording media, and particularly to an optical pickup head compatible with three optical recording media of different formats.

2. Prior Art

An optical pickup head carries out recording and/or reproducing of information such as video, audio or other data from a recording medium. In such system, a semiconductor laser is used for generating a light beam, and an objective lens is used for converging the light beam and forming a focused spot on the recording medium. The recording density of the recording medium is proportional to the size of the focused spot. In general, the size of the focused spot (S) is proportional to the wavelength ($\lambda$), and inversely proportional to the numerical aperture (NA), as expressed by formula (1):

$$S \propto \lambda/NA \qquad (1)$$

Therefore, to increase the recording density, the size of the spot being focused on the optical disk must be reduced. To reduce the spot size, as can be inferred from formula (1), the wavelength ($\lambda$) of the light beam must be reduced and/or the numerical aperture (NA) of the objective lens must be increased. This has been demonstrated by the ongoing development of optical recording media. For example, the wavelength of read beams for compact disks (CDs) is about 780 nm, the wavelength of read beams for digital versatile disks (DVDs) is about 650 nm, and the wavelength of read beams for high-definition DVDs (HD-DVDs) is about 405 nm. Furthermore, the numerical aperture for CDs is 0.45, the numerical aperture for DVDs is 0.6, and the numerical aperture for HD-DVDs is 0.65-0.8.

On the other hand, coma aberration, which occurs due to a tilting of the optical disk, is associated with the tilt angle of the disk, the refractive index of the disk substrate, the thickness of the disk substrate, and the numerical aperture of the objective lens. To ensure an acceptable level of coma aberration with respect to the tilt of a disk for high-density recording, the thickness of the disk substrate is in general reduced accordingly. For example, CDs have a thickness of 1.2 mm, and DVDs have a thickness of 0.6 mm. Further, the thickness of many HD-DVDs is 0.6 mm or less.

In an apparatus for high-density recording onto or playing from a medium such as an HD-DVD, a primary consideration is the compatibility of the apparatus with existing disks including CDs and DVDs. Conventionally, there are two kinds of optical writing and/or reading systems that are used in multi-compatible home entertainment players. In the first kind of optical writing and/or reading system, an independent optical system is provided therein for each type of disk. That is, generally, the optical writing and/or reading system has at least three light sources and three objective lenses for three disks. This kind of writing and/or reading system needs many optical elements, and is unduly large and costly. In the second kind of writing and/or reading system, there are some common optical elements, for example, a common objective lens. This kind of writing and/or reading system is disclosed in U.S. Pat. No. 6,324,150. This kind of writing and/or reading system reduces the total number of optical elements and simplifies the overall configuration. However, the optical performance of the optical pickup head is limited. In respect of the common objective lens, chromatic aberration occurs because each kind of disk operates according to different wavelengths. Further, spherical aberration occurs because the disks have different thicknesses.

SUMMARY OF THE INVENTION

Accordingly, an object of the present invention is to provide a small-sized optical pickup head compatible with three different optical recording media, in which optical aberrations are corrected.

To achieve the above object, an optical pickup head compatible with multiple optical recording media in accordance with the present invention comprises: a first light source for emitting a first light beam with a first wavelength; a second light source for emitting a second light beam with a second wavelength; a third light source for emitting a third light beam with a third wavelength; a prism unit disposed beside the first, second and third light sources, the prism unit including a first portion facing the first light source for passing the first light beam therethrough, a second portion facing the second light source for passing the second light beam therethrough, and a third portion facing the third light source for passing the third light beam therethrough; a reflective multi-surface prism disposed beside the prism unit for redirecting light beams by way of internal reflection; a collimating lens disposed beside the reflective multi-surface prism for collimating light beams; and an objective lens adapted to face any of the optical recording media, for receiving light beams and transmitting the light beams to any of the recording media. The prism unit further includes a first aspherical surface for correcting aberrations of the first light beam caused by non-matching between the first light beam and the collimating and objective lenses, and a second aspherical surface for correcting aberrations of the third light beam caused by non-matching between the third light beam and the collimating and objective lenses.

BRIEF DESCRIPTION OF THE DRAWINGS

Other objects, advantages and novel features of the present invention will be drawn from the following detailed description of preferred embodiments of the present invention with the attached drawings, in which.

DETAILED DESCRIPTION OF THE INVENTION

Figure 1:
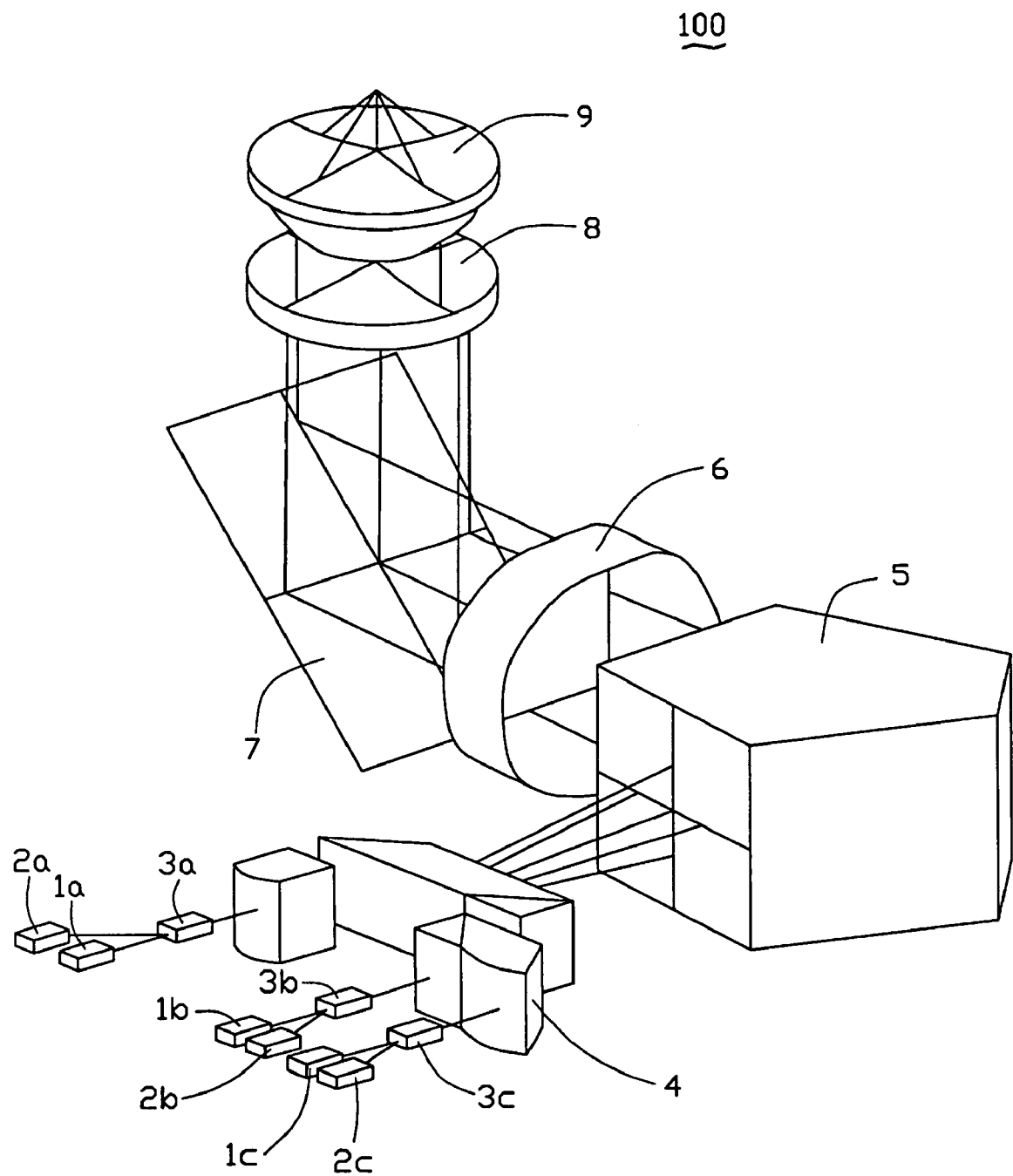
FIG. 1 is an isometric view of an arrangement of an optical pickup head according to a first embodiment of the present invention, also showing essential optical paths thereof.

Referring to FIG. 1, an optical pickup head 100 according to a first embodiment of the present invention is illustrated. The optical pickup head 100 is used in an information recording and/or reproducing device (not shown) compatible with a first optical disk (not shown) having a higher recording density, a second optical disk (not shown) having a lower recording density, and a third optical disk (not shown) having an intermediate recording density between the first and second optical disks. Three light sources 1a, 1b and 1c and three photo detectors 2a, 2b and 2c are respectively used to emit a first, second and third light beams and receive a first, second and third return beams with specific wavelengths according to the first, second and third optical disks. In the present embodiment, the first optical disk is a CD which has a longest wavelength of about 780 nm; the second optical disk is an HD-DVD which has a shortest wavelength of about 405 nm; and the third optical disk is a DVD which has an intermediate wavelength of about 650 nm.

The optical pickup head 100 further comprises three holographic lenses 3a, 3b and 3c, a prism unit 4, a pentagonal prism 5, a collimating lens 6, an optical path changer 7, and an objective lens 9. The light sources 1a, 1b and 1c are juxtaposed with the photo detectors 2a, 2b and 2c respectively. The holographic lenses 3a, 3b and 3c are positioned opposite the respective pairs of a light source and photo detector 1a, 2a, 1b, 2b, and 1c, 2c. The holographic lenses 3a, 3b and 3c are for directly propagating a light beam entering from one side thereof, and deflecting a light beam entering from an opposite side thereof.

Figure 2:
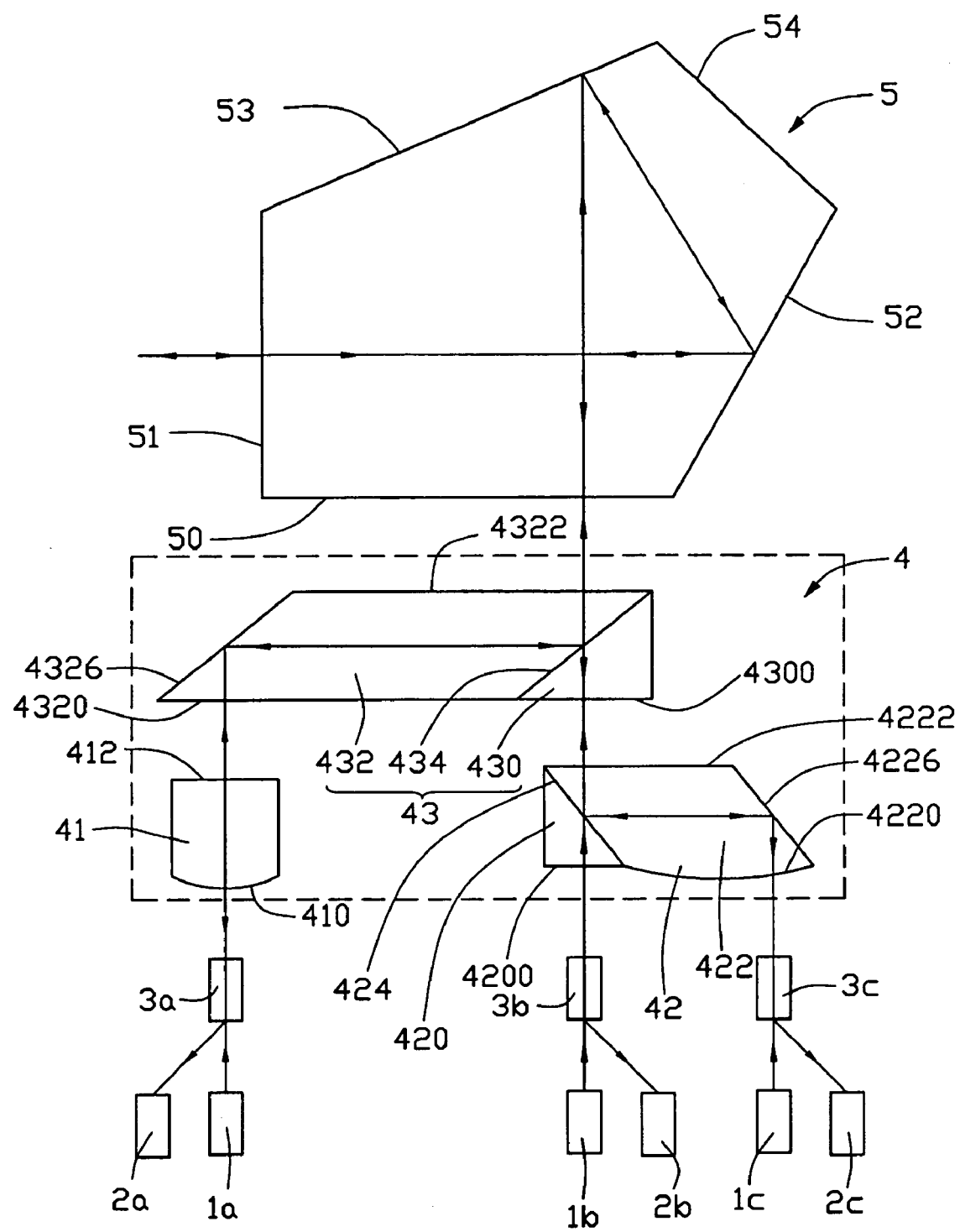
FIG. 2 is a top view of a part of the optical pickup head of the first embodiment of the present invention, also showing essential optical paths thereof.

Also referring to FIG. 2, the prism unit 4 comprises three prisms 41, 42 and 43. The first and second prisms 41 and 42 are juxtaposed on a same side of the third prism 43, and respectively face the first holographic lens 3a and the second and third holographic lenses 3b and 3c. The pentagonal prism 5 is positioned facing an opposite side of the third prism 43. The collimating lens 6 is positioned facing another side of the pentagonal prism 5, and accords with the wavelength of the second light beams so as to converge the second light beams into parallel light beams. The optical path changer 7 is aslant between the collimating lens 6 and the wavelength selector 8, so as to reflect light beams from the collimating lens 6 to the wavelength selector 8. In the illustrated embodiment, the optical path changer 7 is oriented 45° relative to the collimating lens 6 and the wavelength selector 8. The objective lens 9 has a numerical aperture specified by the second optical disk, which is larger than a numerical aperture specified by the first and third optical disks. The wavelength selector 8 is located beside the objective lens 7, to selectively transmit light beams thereto.

The first prism 41 is essentially a rectangular prism with a first aspherical surface, and includes a first incident surface 410 and a first emergent surface 412. In the illustrated embodiment, the first aspherical surface is provided at the first incident surface 410. In alternative embodiments, the aspherical surface can be provided at the first emergent surface 412 or on the third prism 43. The second and third prisms 42, 43 are composite prisms, and respectively include a second and third right-angle prism 420 and 430, a second and third parallelepiped prism 422 and 432, and a second and third interface 424 and 434. The second and third right-angle prisms 420, 430 and the second and third parallelepiped prisms 422, 432 are respectively interconnected by the second and third interfaces 424, 434. The second right-angle prism 420 includes a second incident surface 4200 facing the second holographic lens 3b. The second parallelepiped prism 422 includes a third incident surface 4220 facing the third holographic lens 3c, a third emergent surface 4222, and a third reflective surface 4226. The third reflective surface 4226 interconnects the third incident and emergent surfaces 4220, 4222, and is parallel to the second interface 424. A second aspherical surface is formed on the third incident surface 4220 of the second prism 42. In alternative embodiments, the second aspherical surface can be provided at the third emergent surface 4222 or on the third prism 43. The third right-angle prism 430 of the third prism 43 includes a fourth incident surface 4300 facing the third emergent surface 4222 of the second prism 42. The third parallelepiped prism 432 includes a fifth incident surface 4320 facing the first emergent surface 412 of the first prism 41, a fifth emergent surface 4322, and a fifth reflective surface 4326. The fifth reflective surface 4326 interconnects the fifth incident and emergent surfaces 4320 and 4322, and is parallel to the third interface 434.

The pentagonal prism 5, the collimating lens 6, the optical path changer 7, the wavelength selector 8 and the objective lens 9 are sequentially arranged in a common optical path. The pentagonal prism 5 comprises a sixth incident surface 50, a sixth emergent surface 51, and three sixth reflective surfaces 53, 54 and 55 interconnecting the perpendicular sixth incident and emergent surfaces 50 and 51.

Figure 3A:
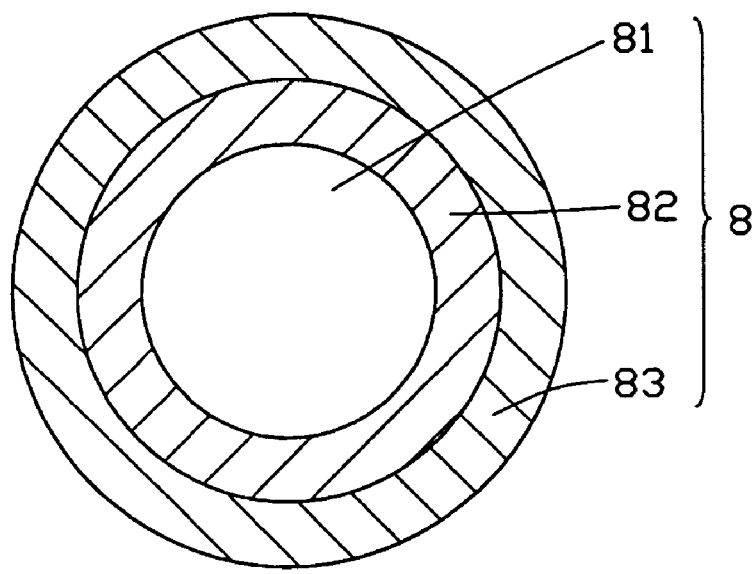
FIG. 3A is an enlarged, schematic transverse cross-sectional view of a wavelength selector of the optical pickup head of FIG. 1.
Figure 3B:
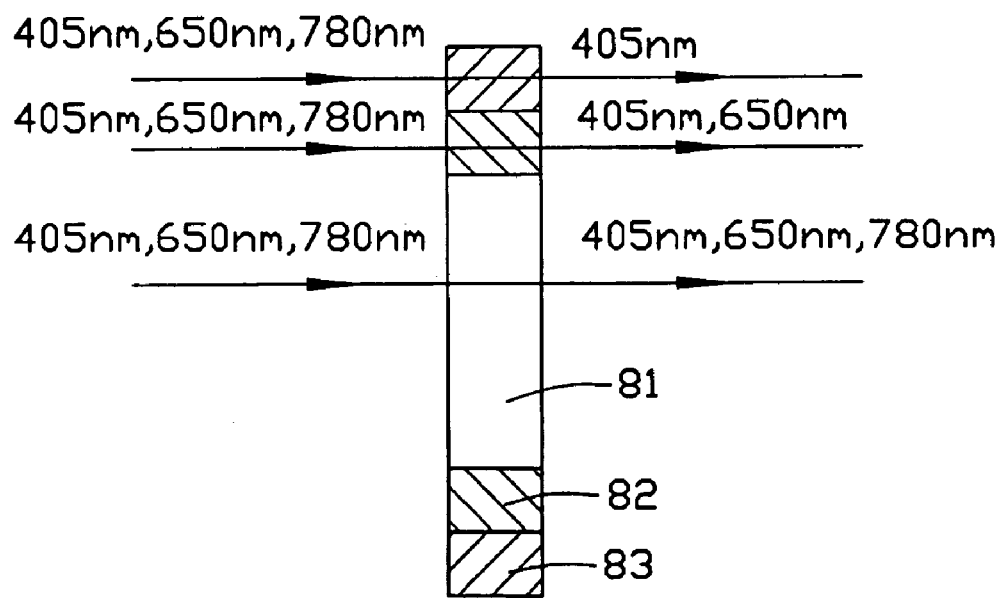
FIG. 3B is an enlarged, schematic axial cross-sectional view of the wavelength selector of the optical pickup head of FIG. 1, also showing wavelength selectivity of various optical paths passing through the wavelength selector.

Now referring to FIGS. 3A and 3B, the wavelength selector 8 comprises a central portion 81, a middle portion 82 encircling the central portion 81, and a peripheral portion 83 encircling the middle portion 82. The three portions 81, 82 and 83 have different transmission functions. With regard to the central portion 81, light beams with any wavelength can pass therethrough. With regard to the middle portion 82, light beams with the second and third wavelengths can pass therethrough, and light beams with the first wavelength are blocked. With regard to the peripheral portion 83, only light beams with the second wavelength can pass therethrough, and light beams with the first and third wavelengths are blocked. Therefore, the NA of the objective lens 9 is different when focusing the light beams with different wavelengths.

When recording an information signal on and/or reproducing an information signal from the first optical disk, the first light source 1 a emits a first light beam having the wavelength of about 780 nm. After passing through the first holographic lens 3a along an original direction thereof, the first light beam enters the first prism 41 through the first incident surface 410. The first light beam is converged by the first incident surface 410, and is output from the first emergent surface 412 of the first prism 41. The first light beam then transmits into the third prism 43 through the fifth incident surface 4320. In the third prism 31, the first light beam is reflected by the fifth reflective surface 4326 and the third interface 434, and is then output from the fifth emergent surface 4322.

After exiting the prism unit 4, the first light beam transmits into the pentagonal prism 5 through the sixth incident surface 50, and exits the pentagonal prism through the sixth emergent surface 51 after being reflected by and between the sixth reflective surfaces 53 and 52. The first light beam passes through the collimating lens 6 and is transformed into a first luminous flux of approximately parallel light beams.

The first luminous flux transmits to the optical path changer 7, which changes the transmitting direction toward the first optical disk. Accordingly, the first luminous flux illuminates the wavelength selector 8. The middle and peripheral portions 82, 83 of the wavelength selector 8 block the first luminous flux, so that only a central part of the first luminous flux passes through the wavelength selector 8 and is incident on the objective lens 9. The objective lens 9 converges the incident first luminous flux to form a focused light spot (not shown) on the first optical disk.

After forming the light spot on the first optical disk, the first optical disk reflects the incident beam as a first return beam (not labeled). The first return beam sequentially passes through/from the objective lens 9, the wavelength selector 8, the optical path changer 7, the collimating lens 6, the pentagonal prism 5 and the prism unit 4, and reaches the first holographic lens 3a. The first holographic lens 2a deflects the first return beam toward the first photo detector 2a. Then, the first photo detector 2a receives the first return beam and generates corresponding electrical signals.

When recording an information signal on and/or reproducing an information signal from the second optical disk, the second light source 1b emits a second light beam (not labeled) having the wavelength of about 405 nm. The second light beam propagates through the second holographic lens 3b along an original direction thereof, and enters the second prism 42 through the second incident surface 4200. The second light beam propagates to the second interface 424 of the second prism 42, and passes through the second interface 424 along its original direction because of its short wavelength. Subsequently, the second light beam is output from the third emergent surface 4222. Subsequently, the second light beam transmits into the third prism 43 through the fifth incident surface 4320. In the third prism 3l, the second light beam passes through the third interface 434 along its original direction because of its short wavelength. Subsequently, the second light beam is output from the fifth emergent surface 4322.

After exiting the prism unit 4, the second light beam transmits into the pentagonal prism 54 through the sixth incident surface 50, and propagates to the sixth emergent surface 51 after being reflected by the sixth reflective surfaces 53 and 52. The second light beam is condensed by the collimating lens 6, and transformed into a second luminous flux of parallel light beams. The second luminous flux transmits to the optical path changer 7, which changes the transmitting direction toward the second optical disk. Accordingly, the second luminous flux illuminates the wavelength selector 8. The wavelength selector 8 does not block any of the second luminous flux, so that the second luminous flux completely passes through the wavelength selector 8 and is incident on the objective lens 9. The objective lens 9 converges the second luminous flux to form a focused light spot (not shown) on the second optical disk.

After forming the light spot on the second optical disk, the second optical disk reflects the incident beam as a second return beam (not labeled). The second return beam sequentially passes through/from the objective lens 9, the wavelength selector 8, the optical path changer 7, the collimating lens 6, the pentagonal prism 5 and the prism unit 3, and reaches the second holographic lens 22. The second holographic lens 3b deflects the second return beam toward the second photo detector 2b. Then, the second photo detector 2b receives the second return beam and generates corresponding electrical signals.

When recording an information signal on and/or reproducing an information signal from the third optical disk, the third light source 1c emits a third light beam (not labeled) having the wavelength of about 650 nm. The third light beam propagates through the third holographic lens 3c along an original direction thereof, and enters the second prism 42 through the third incident surface 4220. The third light beam is converged by the third incident surface 4220. In the second prism 42, the third light beam is reflected by the third reflective surface 4226 and the second interface 424, and is then output from the third emergent surface 4222. The third light beam then transmits into the third prism 43 through the fourth incident surface 4300. In the third prism 31, the third light beam passes through the third interface 434 along its original direction because of its relatively short wavelength. Subsequently, the third light beam is output from the fifth emergent surface 4322.

After exiting the prism unit 4, the third light beam transmits into the pentagonal prism 54 through the sixth incident surface 50, and propagates to the sixth emergent surface 51 after being reflected by the sixth reflective surfaces 53 and 52. The third light beam is condensed by the collimating lens 6 and transformed into a third luminous flux of approximately parallel light beams. The third luminous flux transmits to the optical path changer 7, which changes the transmitting direction toward the third optical disk. Accordingly, the third luminous flux illuminates the wavelength selector 8. The peripheral portion 83 of wavelength selector 8 blocks the third luminous flux, so that only central and intermediate parts of the third luminous flux pass through the wavelength selector 8 and are incident on the objective lens 9. The objective lens 9 converges the third luminous flux to form a focused light spot (not shown) on the third optical disk.

After forming the light spot on the third optical disk, the third optical disk reflects the incident beam as a third return beam (not labeled). The third return beam sequentially passes through/from the objective lens 9, the wavelength selector 8, the optical path changer 7, the collimating lens 6, the pentagonal prism 5 and the prism unit 3, and reaches the third holographic lens 3c. The third holographic lens 3c deflects the third return beam toward the third photo detector 2c. Then, the third photo detector 2c receives the third return beam and generates corresponding electrical signals.

Figure 4:
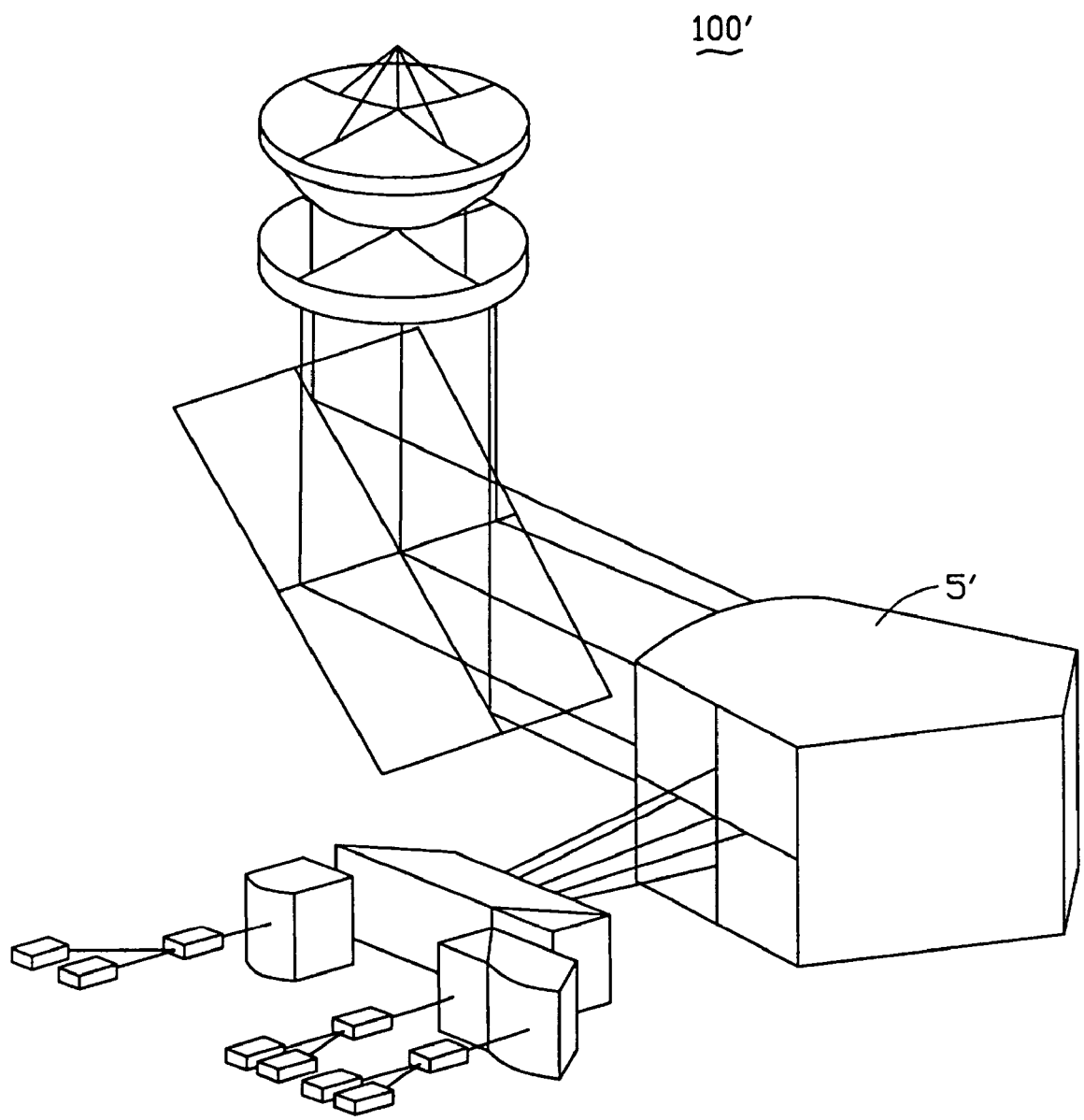
FIG. 4 is an isometric view of an arrangement of an optical pickup head according to a second embodiment of the present invention, also showing essential optical paths thereof.

Referring to FIG. 4, an optical pickup head 100' in accordance with the second embodiment of the present invention is illustrated. A significant difference of the optical pickup head 100' relative to the optical pickup head 100 is that a composite pentagonal prism 5' is provided, instead of having the pentagonal prism 5 and the collimating lens 6. The pentagonal prism 5' includes a collimating surface (not labeled) at an emergent surface thereof, for collimating light beams passing therethrough.

Figure 5:
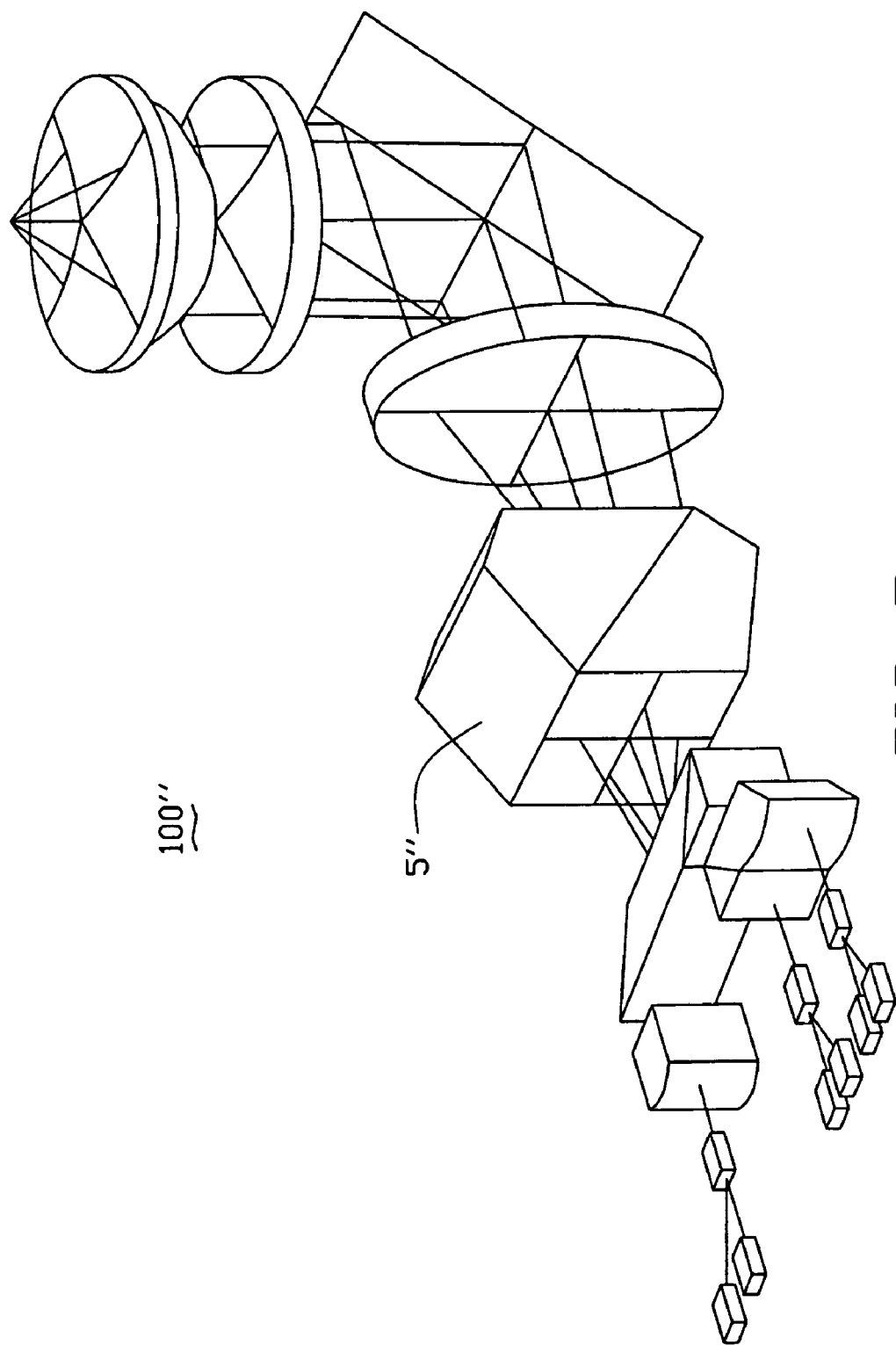
FIG. 5 is an isometric view of an arrangement of an optical pickup head according to a third embodiment of the present invention, also showing essential optical paths thereof.
Figure 6:
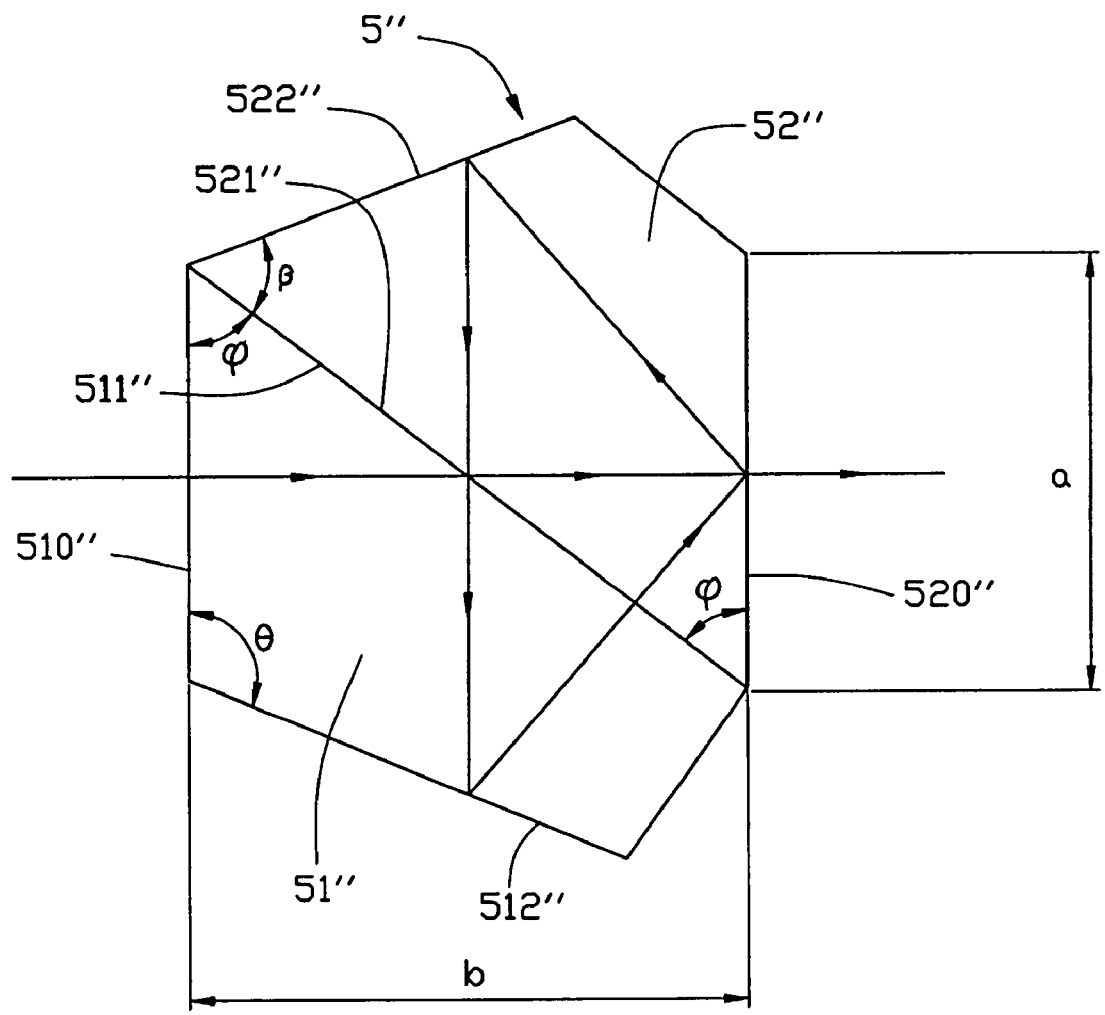
FIG. 6 is a front view of a pechan prism of the optical pickup head of the third embodiment of the present invention, also showing essential optical paths thereof.

Referring to FIGS. 5 and 6, an optical pickup head 100" in accordance with the third embodiment of the present invention is illustrated. Compared with the first embodiment, the optical pickup head 100" utilizes a pechan prism 5" instead of the pentagonal prism 5. The pechan prism 5" is a composite prism, and comprises a first portion 51" and a second portion 52". The first portion 51" includes a seventh incident surface 510", and two seventh reflective surfaces 511", 512" adjacent opposite ends of the seventh incident surface 510". The second portion 52' includes a seventh emergent surface 520", and two eighth reflective surfaces 521", 522". The seventh and eighth reflective surfaces 511" and 521" are partially coated with a reflective coating, and are adhered together to integrate the first and second portions 51" and 52". The seventh emergent surface 520" is parallel to the seventh incident surface 510". Other parameters of the pechan prism 5" are as follows: width a=4 mm; width b=4.848 mm; angle φ=45°; angle θ=112.5°; and angle β=67.5°.

When an incident light beam perpendicularly enters the pechan prism 5" via the seventh incident surface 510", the light beam is reflected by the reflective coating of the seventh reflective surface 511" and then by the seventh reflective surface 512". The reflected light beam propagates to an uncoated part of the seventh reflective surface 511", passes directly through the seventh reflective surface 511", and enters the second portion 52". The light beam obliquely illuminates the seventh emergent surface 520", is reflected by the seventh emergent surface 520" and then by the eighth reflective surfaces 522", 521", and finally perpendicularly exits the pechan prism 5" via the seventh emergent surface 520".

The optical pickup heads 100, 100' and 100" provide good performance for all three kinds of optical disks. Both (i) the working wavelength of optical elements, such as the second light source 1b, the collimating lens 6 and the objective lens 9, and (ii) the numerical aperture of the objective lens 9, are directly matched with requirements of the second optical disk. Therefore, when recording an information signal on and/or reproducing an information signal from the second optical disk, the optical pickup heads 100, 100' and 100" provide high quality light convergence to the focused light spot. Further, because the first and second aspherical surfaces are respectively formed on the first prism 41 and the second prism 42, aberrations caused by non-matching between the first and third luminous fluxes and the collimating lens 6 and objective lens 9 are corrected. Moreover, only a central part of the objective lens 9 is illuminated by the first and third light beams, so the NA of the objective lens 9 is reduced when focusing the first and third light beams, and corresponds to the small NA required by the first and third optical disks. Therefore, when recording an information signal on and/or reproducing an information signal from the first and third optical disks, the optical pickup heads 100, 100' and 100" provide high quality light convergence to the focused light spot.

The optical pickup heads 100, 100' and 100" also have structural and other advantages. Because the first, second and third light beams are reflected by the prism unit 4 and the pentagonal prism 5 (or 5') or the pechan prism 5", the optical path length between the optical path changer 7 and the first, second and third light sources 1a, 1b and 1c is reduced. This enables the optical pickup heads 100, 100' and 100" to be miniaturized. In addition, the first and second aspherical surfaces are directly formed on the first and second prisms 41 and 42 respectively, so that no extra optical element need be added to the optical pickup heads 100, 100' and 100". This further facilitates miniaturization of the optical pickup heads 100, 100' and 100", and improves the efficiency of mass production. Furthermore, the collimating lens 6 can be integrally formed with the pentagonal prism 5 (or 5') or the pechan prism 5", thereby even further facilitating miniaturization.

Although the present invention has been described with reference to specific embodiments, it should be noted that the described embodiments are not necessarily exclusive, and that various changes and modifications may be made to the described embodiments without departing from the scope of the invention as defined by the appended claims.

What is claimed is:

1. An optical pickup head compatible with multiple optical recording media, comprising:

a first light source for emitting a first light beam with a first wavelength;

a second light source for emitting a second light beam with a second wavelength;

a third light source for emitting a third light beam with a third wavelength;

a prism unit disposed beside the first, second and third light sources, the prism unit including a first portion facing the first light source for passing the first light beam therethrough, a second portion facing the second light source for passing the second light beam therethrough, and a third portion facing the third light source for passing the third light beam therethrough;

a reflective multi-surface prism disposed beside the prism unit for redirecting light beams by way of internal reflection;

a collimating lens disposed beside the reflective multi-surface prism for collimating light beams; and an objective lens adapted to face any of the optical recording media, for receiving light beams and transmitting the light beams to any of the recording media;

wherein the prism unit further includes a first aspherical surface for correcting aberrations of the first light beam caused by non-matching between the first light beam and the collimating and objective lenses, and a second aspherical surface for correcting aberrations of the third light beam caused by non-matching between the third light beam and the collimating and objective lenses.

2. The optical pickup head according to claim 1, wherein the first, second and third light sources are juxtaposed with each other and disposed at a same side of the prism unit.

3. The optical pickup head according to claim 2, wherein the prism unit comprises a first prism, a second prism and a third prism, the first and second prisms are juxtaposed at a side of the third prism, and the first and second prisms face the first and the second and third light sources respectively.

4. The optical pickup head according to claim 3, wherein the first aspherical surface is provided on the first prism.

5. The optical pickup head according to claim 4, wherein the second aspherical surface is provided on the second prism.

6. The optical pickup head according to claim 5, wherein the reflective multi-surface prism is disposed on an opposite side of the third prism, and an incident surface of the reflective multi-surface prism faces the third prism.

7. The optical pickup head according to claim 6, wherein the reflective multi-surface prism is a pentagonal prism.

8. The optical pickup head according to claim 7, wherein the reflective multi-surface prism and the collimating lens are integrally formed.

9. The optical pickup head according to claim 6, wherein the reflective multi-surface prism is a pechan prism.

10. The optical pickup head according to claim 9, wherein an incident surface and an emergent surface of the pechan prism are parallel to each other.

11. The optical pickup head according to claim 10, wherein the collimating lens and the pechan prism are integrally formed.

12. The optical pickup head according to claim 6, further comprising an optical path changer between the collimating lens and the objective lens, the optical path changer being oriented at an angle of 45° relative to the collimating lens and the objective lens.

13. The optical pickup head according to claim 6, further comprising a wavelength selector disposed beside the objective lens for selectively transmitting light beams therethrough.

14. An optical pickup head compatible with multiple optical recording media, comprising:
- three light sources for respectively emitting a first, a second and a third light beams with different wavelengths;
- a prism unit disposed beside the three light sources, including:
  - a first aspherical surface for correcting aberrations of one of the first, second and third light beams caused by non-matching;
  - a second aspherical surface for correcting aberrations of another of the first, second and third light beams caused by non-matching;
  - a first interface; and
  - a second interface; wherein the first light beam is reflected by the first interface, the second light beam directly passes through the first and second interfaces, and the third light beam is reflected by the second interface and directly passes through the first interface;
- a reflective multi-surface prism disposed beside the prism unit for redirecting light beams by way of internal reflection; and
- a collimating lens disposed beside the reflective multi-surface prism for collimating light beams therethrough;
- wherein the first aspherical surface at least partly corrects aberrations of said one of the first, second and third light beams caused by non-matching between said one of the first, second and third light beams and the collimating lens, and the second aspherical surface at least partly corrects aberrations of said another of the first, second and third light beams caused by non-matching between said another of the first, second and third light beams and the collimating lens.

15. The optical pickup head according to claim 14, wherein the reflective multi-surface prism is a pentagonal prism, and the pentagonal prism has an incident surface and an emergent surface perpendicular to each other.

16. The optical pickup head according to claim 15, wherein the collimating lens is attached to the emergent surface of the pentagonal prism.

17. The optical pickup head according to claim 14, wherein the reflective multi-surface prism is a pechan prism, and the pechan prism has an incident surface and an emergent surface parallel to each other.

18. An information recording and/or reproducing device compatible with multiple different optical recording media, said device having an optical pickup head to obtain information from a selective one of said multiple different optical recording media, said optical pickup head further comprising:
- a first light source emitting a first light beam with a first wavelength;
- a second light source emitting a second light beam with a second wavelength greater than said first wavelength;
- a third light source emitting a third light beam with a third wavelength greater than said second wavelength;
- a prism unit facing said first, second and third light sources for receiving said first, second and third light beams therefrom respectively, said prism unit having a first aspherical surface disposed to exclusively allow passage of said third light beam in said prism unit and a second aspherical surface disposed to exclusively allow passage of said second light beam in said prism unit;
- a reflective multi-surface prism for receiving said first, second and third light beams from said prism unit, and reflecting said received first, second and third light beams therein at least two times, and
- an objective lens disposed next to said selective one of said multiple different optical recording media for receiving said first, second and third light beams from said reflective multi-surface prism and transmitting said first, second and third light beams to said selective one of said multiple different optical recording media.

19. The information recording and/or reproducing device according to claim 18, wherein said prism unit has a first prism facing said third light source to receive said third light beam and a second prism facing said first and second light sources to receive said first and second light beams respectively, and said first aspherical surface is formed on said first prism and said second aspherical surface is formed on said second prism.

20. The information recording and/or reproducing device according to claim 18, wherein said reflective multi-surface prism is one of a pentagonal prism, a composite pentagonal prism with an integrally collimating surface and a pechan prism.

* * * * *